W. S. GOULD.
ELECTRIC BATTERY.
APPLICATION FILED MAR. 27, 1912.

1,073,601

Patented Sept. 23, 1913
3 SHEETS—SHEET 3.

Attest:

Inventor:
William S. Gould
by Kenyon & Kenyon
Attys

UNITED STATES PATENT OFFICE.

WILLIAM S. GOULD, OF NEW YORK, N. Y., ASSIGNOR TO GOULD STORAGE BATTERY COMPANY, A CORPORATION OF NEW YORK.

ELECTRIC BATTERY.

1,073,601.  Specification of Letters Patent.  Patented Sept. 23, 1913.

Application filed March 27, 1912.  Serial No. 686,655.

*To all whom it may concern:*

Be it known that I, WILLIAM S. GOULD, a citizen of the United States, and a resident of New York, county of New York, and State of New York, have invented certain new and useful Improvements in Electric Batteries, of which the following is a specification.

My invention relates to improvements in storage batteries and more especially batteries designed for use in submarine boats and the like.

One object of my invention is to so arrange the various parts of a sealed storage battery cell that the plates thereof may be easily removed in small units and in an expeditious manner.

Further objects, features and advantages will more clearly appear from the detailed description given below taken in connection with the accompanying drawings which form a part of this specification.

Figure 1:
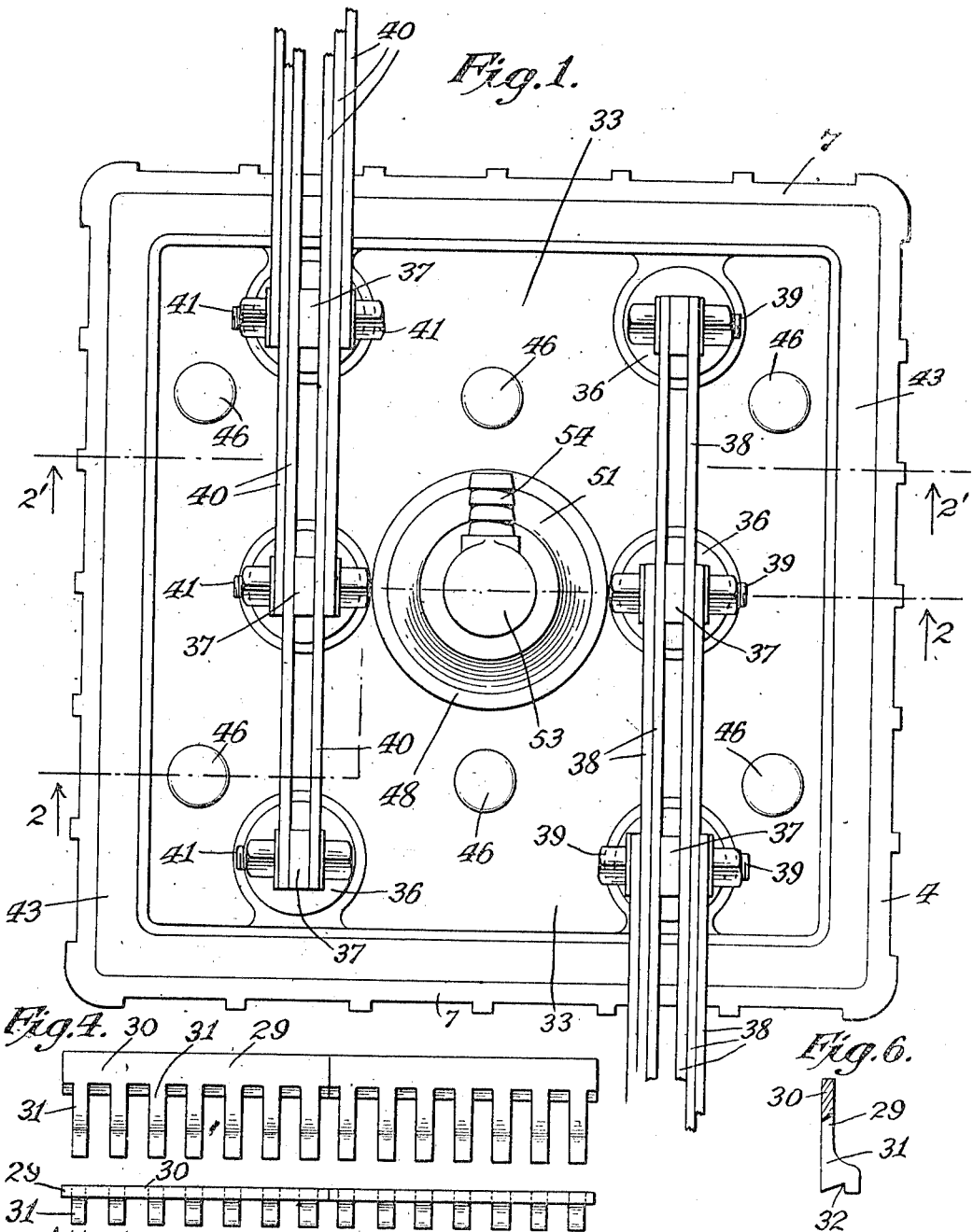
Figure 2:
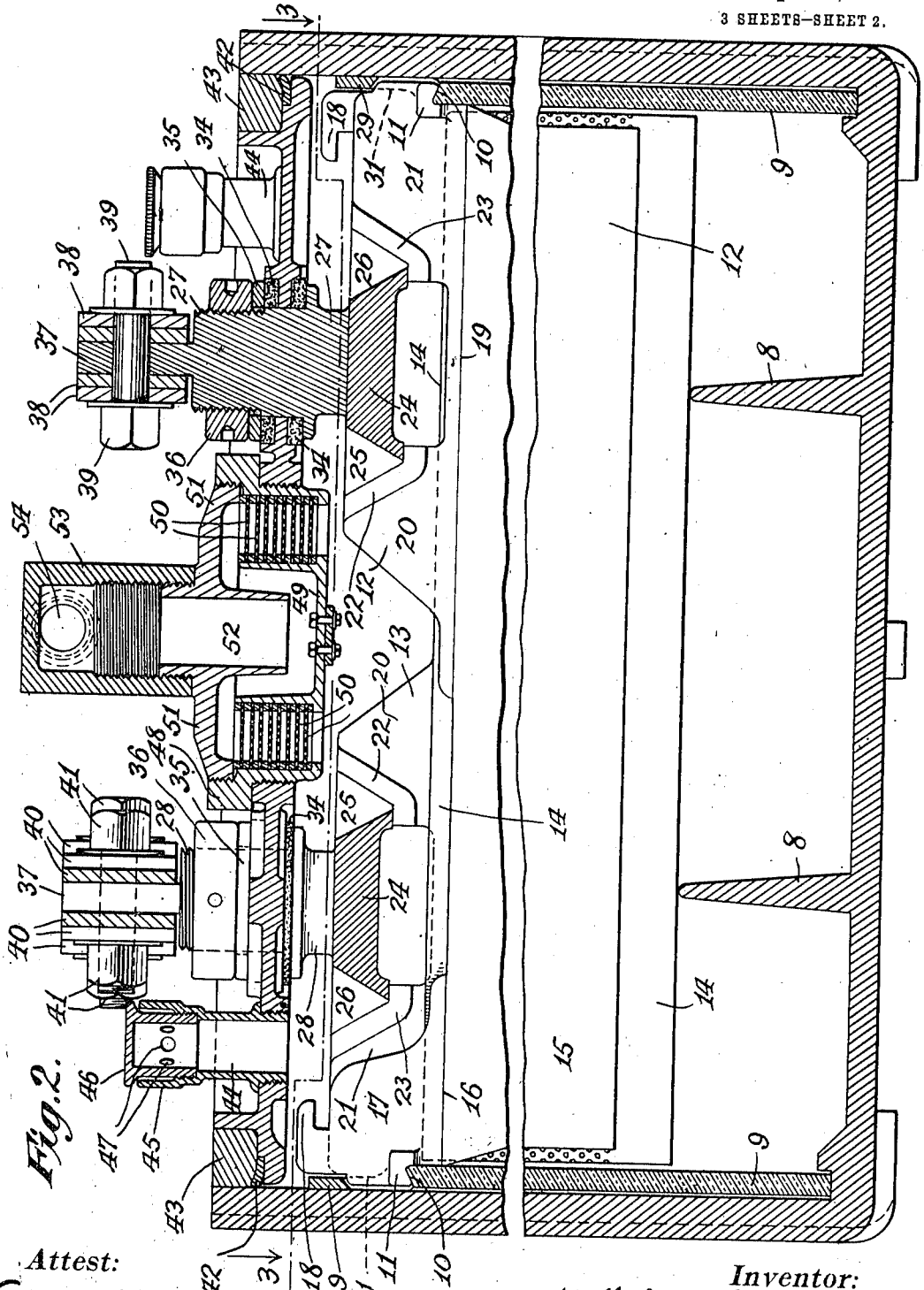
Figure 3:
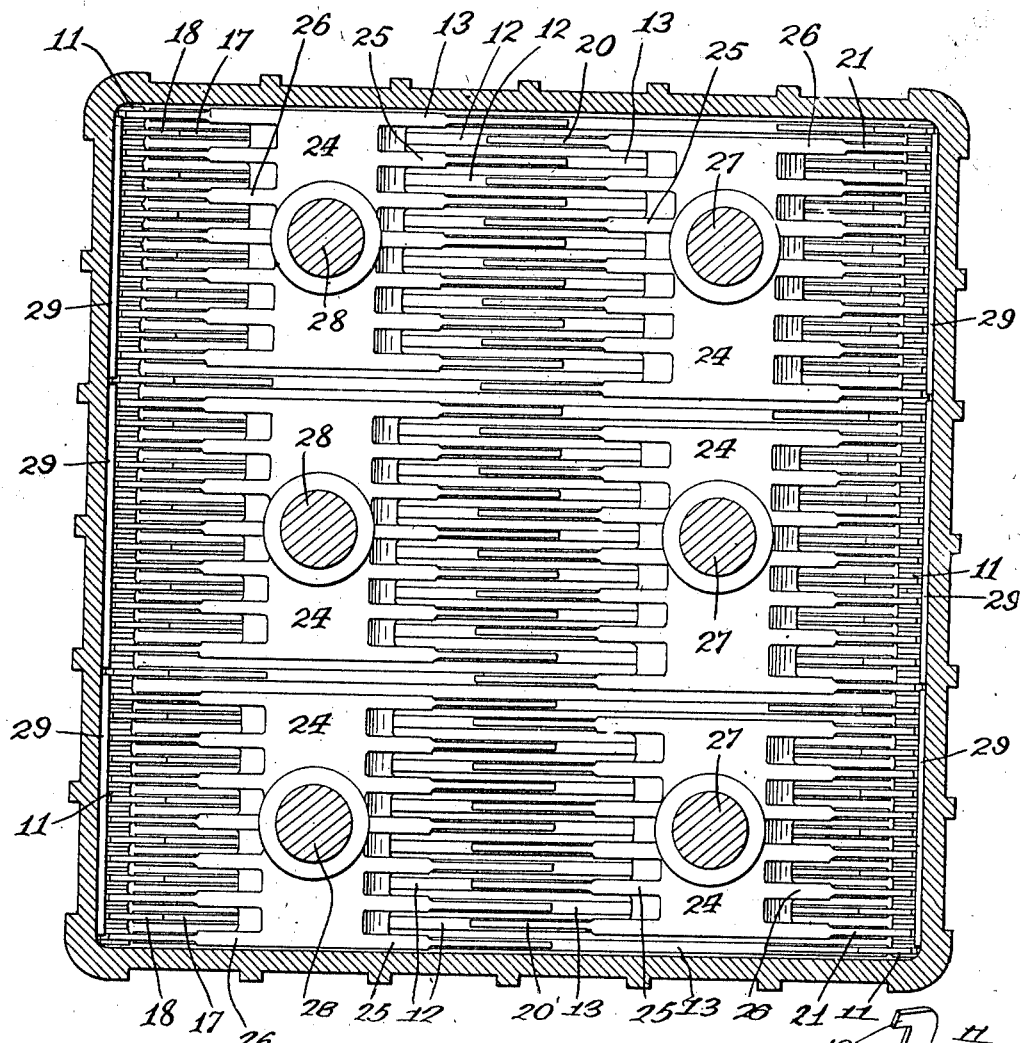
Figure 7:
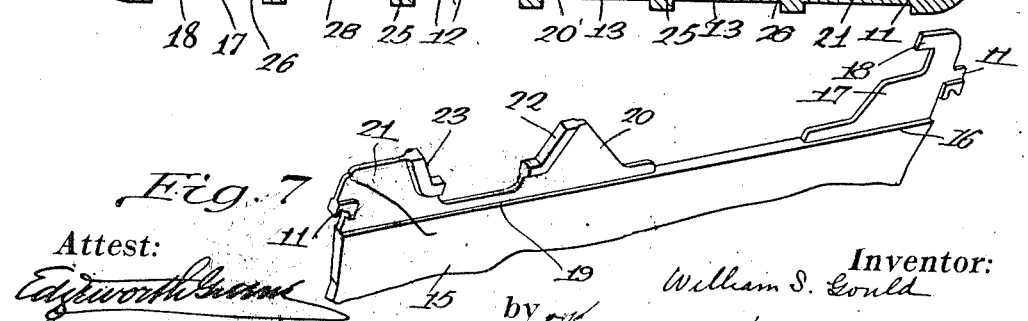

In the drawings Figure 1 is a top plan view of a storage battery cell embodying my improvements in one form. Fig. 2 is a transverse section of the same, that part above the line 3—3 being taken on the line 2—2 of Fig. 1, and that part below the line 3—3 being taken on the line 2'—2' of Fig. 1. Fig. 3 is a transverse horizontal section taken on the line 3—3 of Fig. 2. Figs. 4, 5 and 6 are respectively a front, top and sectional view of one of the spacing pieces. Fig. 7 is a perspective of the top of one of the plates of the cell before being attached to its bus bar.

Referring to the various figures, 7 represents a suitable containing vessel of hard rubber provided with upwardly projecting supporting ribs 8. At the sides of the vessel are glass plates 9 having their upper edges beveled off at 10 to fit the enlarged lugs 11, integral with the positive and negative plates 12 and 13. The lugs 11 are hook shaped or hooked to engage the beveled faces at 10, as shown in Fig. 2, in order to prevent them slipping off the glass supporting plates 9. The lugs 11 are also considerably thicker than the body portion of the plates in order that they will not wear off so quickly. By beveling off the top of the glass supporting plate at 10 and having the lower sides of the lugs 11 beveled off at an angle to the horizontal to fit the top of the glass plate, the glass plate may lie close to the wall of the cell and thus save space and at the same time hold the plates from slipping off. That is, it is unnecessary to extend the lug down on the outside of the glass supporting plates. Between the plates are placed suitable separating means 14 (not shown in Fig. 3) which may be in the form of sheets of wood veneer with perforated rubber sheets beside the same. The plates 12 and 13 are substantially the same in shape except that they are placed in the cell in reverse manner. Each plate 12 and 13 consists of a body portion 15 having lead burned to its top edge at 16, an upwardly extending projection 17 carrying one of the integral lugs 11. The part 17 is also provided with a hooked portion 18 adapted for engagement with any suitable lifting tool for the purpose of lifting the plates out of the cell when desired. Each plate also has lead burned to its top edge at 19, an upwardly extending part forming two projections 20 and 21. The part 21 is provided with another lug 11 engaging over one of the glass plates 9. As shown in Fig. 3 the parts 17, 18, 20 and 21, are slightly thinner than the body portions of the plates 12 and 13. At 22 and 23 the parts 20 and 21 respectively are thicker and are lead burned to the bus bars 24 by lead burning at 25 and 26.

From Fig. 3 it will be noted that the positive plates are divided into three sets, the plates of each set being lead burned to a common bus bar 24 and having a common terminal at 27, while the negative plates are likewise divided into three sets, the plates of each set having a common bus 24 and a common terminal 28. It will therefore be seen that the plates are divided into sets of 13 plates (positive and negative) with common terminals 27 and 28, all of the sets having a common cell for containing them, whereby the cell may be made as large as desired, instead of using a plurality of small cells with small plates. Each of such sets is provided with independent spacing pieces 29 of semi-hard rubber. Each of said spacing pieces consists of a longitudinal portion 30 (see Figs. 4, 5 and 6) with depending separating members 31 cut away at 32 to fit over the glass plates 9, the portions 31 lying between the lugs 11 of adjacent plates to keep them from contacting with one another.

The cover 33 forming the top wall of the sealed cell is provided with suitable openings through which the terminals 27 and 28 independently pass. Each terminal is provided with soft rubber packing rings 34, a washer 35 and nut 36, in order to form a sealed tight joint. Projecting upwardly from and forming part of each terminal is a lug 37. The positive lugs 37 are adapted to be connected together electrically by copper bars 38 secured to the lugs 37 by bolts 39. In a similar manner the negative lugs 37 are electrically connected by copper bars 40 and bolts 41. The cover 33 is provided with a soft rubber strip 42 which forms a substantially tight joint about the edges of the cover. Over this is poured a suitable sealing compound 43 in order that the cell may be thoroughly sealed.

44 represents air inlets enlarged at the top, as at 45, into which are screw threaded hollow caps 46 having air inlet openings 47 therein. This forms an exceptionally simple and efficient intake vent and one out of which the liquid of the cell will not slop.

The outlet vent comprises a member 48 screw threaded into the cover and carrying a cup shaped central member 49 between which and the side walls of the member 48 are horizontally placed a series of perforated baffle plates 50, these parts being covered by a member 51 screw threaded into the member 48, and having a central aperture 52 extending down into the cup shaped member 49. Screwed on top of the member 51 over its central aperture 52 is a hollow cap member 53 adapted to connect with rubber tubing at 54, to provide a suitable exhaust passage for the cell gases.

The general operation of the cell will be readily understood from the above by those skilled in the art.

Battery cells of the class described which are used for submarine boat work, are necessarily large and heavy, primarily due to the large number of and large size of the plates in each cell or container. Further requirements of such cells are that they shall be thoroughly sealed and removable in sections. That is, if the parts were arranged so that all of the plates might be removed from the cell together this would be impractical because of the enormous weight and size thereof, such that it would require machinery to remove them. It has been suggested that each plate have an independent terminal projecting through the cover through independent holes in the cover. But this has been found to be impractical because of the large number of small holes in the cover which, because of their number and size, it is almost impossible to seal thoroughly. This method would also be extremely expensive. Therefore there should be as few conductors passing through the walls of the cell as possible. It has also been suggested that the bars 38 and 40 be placed beneath the cover 33, in which case there would only need to be two conductors (one positive and one negative) passing out through the cover. This would be advantageous from the sealing standpoint, but if the bars 38 and 40 together with the bolts 39 and 41, be placed inside the cell, the cell gases would soon eat them away, since they cannot be made of lead and burned to the terminals 37, as they must be readily removable therefrom in order that the plates may be removed in sections. The great importance of my improved arrangement whereby the plates of the cell are divided into a plurality of sets, each set having a common terminal, will therefore be seen, whereby the number of conductors passing through the cover is so few as to be not objectionable, and whereby the copper conductors may be bolted to the terminals outside the sealed cover so that they will not be attacked by the acid fumes of the cell. In order to remove the plates from the cell it is only necessary to remove the bolts 39 and 41 and then the bars 38 and 40, unseal the cover and remove the same, when any suitable lifting tool may be applied, first to one set of plates to remove the same, and then to the next set of plates, and so on.

I am aware that it has been suggested to divide the plates of a cell into sets, the plates of each set having a common terminal, which terminals are connected together in some manner, but in such cells the said terminals have not extended independently through the walls or cover of the cell, whereby the cell could be sealed and the terminals connected by copper conductors bolted thereto on the outside of the cell.

Although I have described my improvements in great detail and with respect to one embodiment thereof, nevertheless I do not desire to be limited to such details except as clearly specified in the appended claim, since many changes and modifications will readily suggest themselves to those skilled in the art without departing from the spirit and scope of my invention in its broader aspects.

Having fully and clearly described my improvements, what I claim as new and desire to secure by Letters Patent, is:

In a storage battery cell, the combination of a containing jar, a plurality of sets of negative and of positive plates within the jar, a separate non-corrosive bus bar within the jar for each set of negative plates and for each set of positive plates extending transversely of the plates of its set to which the plates of the set are burned, a cover sealed on the jar to inclose the plates and busses and provided with openings for terminals extending from the said busses, a separate terminal for each bus connected thereto and extending up through one of said openings and above the cover and adapted to receive a detachable connection at its outer end, and detachable connections above the cover for detachably connecting the respective projecting negative terminals and the respective projecting positive terminals, whereby the cover may be removed without destroying the terminals or their connections and any set of plates may be readily cut out or removed for repairs or inspection or replaced without disturbing the other sets.

In testimony whereof, I have signed my name to this specification, in the presence of two subscribing witnesses.

WILLIAM S. GOULD.

Witnesses:
 CHARLES M. GOULD,
 A. J. EGAN.